(12) United States Patent
Ryan et al.

(10) Patent No.: US 10,204,641 B2
(45) Date of Patent: Feb. 12, 2019

(54) RECORDING SYSTEM FOR GENERATING A TRANSCRIPT OF A DIALOGUE

(71) Applicant: ECONIQ LIMITED, Galway (IE)

(72) Inventors: Stephen Ryan, Dingle (IE); James Callan, Dublin (IE)

(73) Assignee: ECONIQ LIMITED, Galway (IE)

( * ) Notice: Subject to any disclaimer, the term of this patent is extended or adjusted under 35 U.S.C. 154(b) by 16 days.

(21) Appl. No.: 15/521,111

(22) PCT Filed: Oct. 5, 2015

(86) PCT No.: PCT/EP2015/072943
§ 371 (c)(1),
(2) Date: Apr. 21, 2017

(87) PCT Pub. No.: WO2016/066377
PCT Pub. Date: May 6, 2016

(65) Prior Publication Data
US 2018/0012619 A1    Jan. 11, 2018

(30) Foreign Application Priority Data

Oct. 30, 2014   (EP) .................................... 14191112

(51) Int. Cl.
*G10L 21/10* (2013.01)
*H04M 3/42* (2006.01)
(Continued)

(52) U.S. Cl.
CPC .......... *G10L 21/10* (2013.01); *G06F 3/04817* (2013.01); *G06F 13/102* (2013.01);
(Continued)

(58) Field of Classification Search
None
See application file for complete search history.

(56) References Cited

U.S. PATENT DOCUMENTS 8,255,923 B2   8/2012   Youel et al.
9,165,556 B1 *  10/2015   Sugar ...................... G10L 15/10
(Continued)

FOREIGN PATENT DOCUMENTS

WO   00/26817 A1   5/2000
WO   WO 0026817 A1 *  5/2000   ............. G06Q 10/06
(Continued)

OTHER PUBLICATIONS

International Preliminary Report on Patentability issued in PCT/EP2015/072943; dated May 2, 2017; 7pp.
(Continued)

*Primary Examiner* — Richa Mishra
(74) *Attorney, Agent, or Firm* — Studebaker & Brackett PC (57) ABSTRACT

A recording system has a listener processor for automatically capturing events involving computer applications during a dialog involving the user of the computer. The system generates a visual transcript of events on a timeline. It automatically detects start of a dialog and proceeds to detect events and determines if they are configured as transcript events, before detecting end of the dialog. The system may associate dialog events with audio clips, using meta tags.

16 Claims, 7 Drawing Sheets

(51) Int. Cl.
| | |
|---|---|
| *H04M 3/51* | (2006.01) |
| *G10L 15/08* | (2006.01) |
| *G10L 15/30* | (2013.01) |
| *G06Q 30/00* | (2012.01) |
| *G06F 3/0481* | (2013.01) |
| *G06F 13/10* | (2006.01) |

(52) U.S. Cl.
CPC ............ *G06Q 30/016* (2013.01); *G10L 15/08* (2013.01); *G10L 15/30* (2013.01); *H04M 3/42221* (2013.01); *H04M 3/5183* (2013.01); *G10L 2015/088* (2013.01); *H04M 2201/40* (2013.01); *H04M 2203/252* (2013.01)

(56) References Cited

U.S. PATENT DOCUMENTS

| | | | |
|---|---|---|---|
| 2006/0074623 | A1 | 4/2006 | Tankhiwale et al. |
| 2014/0244252 | A1 | 8/2014 | Dines et al. |
| 2014/0282125 | A1* | 9/2014 | Duneau ................ G06F 3/0481 715/762 |

FOREIGN PATENT DOCUMENTS

| | | | |
|---|---|---|---|
| WO | 01/52510 A1 | 7/2001 | |
| WO | WO 0152510 A1 * | 7/2001 | ........ H04M 3/42221 |

OTHER PUBLICATIONS

International Search Report issued in PCT/EP2015/072943; dated Dec. 22, 2015.

\* cited by examiner

Legend:

Customer operating a device or computer application

User operating a device or computer application

Voice communication or voice instruction

Audio Recording System Database Table 59

| Id | User Id | Customer Id | Recorded At | Audio File (could be embedded as a blob or file reference) |
|---|---|---|---|---|
| 224 | 10001 | XM12345678 | 11:23:45 22/08/2014 | D:\Recordings\Aug 2014\112345-22082014-XM12345678.mp3 |
| 225 | 10012 | XM23423234 | 11:23:56 22/08/2014 | D:\Recordings\Aug 2014\112356-22082014-XM23423234.mp3 |
| 226 | 10005 | XH45465676 | 11:24:11 22/08/2014 | D:\Recordings\Aug 2014\112411-22082014-XH45465676.mp3 |

Database Table For Storing Visual Transcript 60

| id | trailId | userId | customerUniqueId | trailStartTime | trailEndTime | trailEventSequence |
|---|---|---|---|---|---|---|
| 934 | 25 | 10001 | XM12345678 | 11:23:45 22/08/2014 | 11:25:51 22/08/2014 | 250000:2014-08-22 11:23:45;250024:2014-08-22 11:24:03;250280:2014-08-22 11:24:20;250160:2014-08-22 11:24:42;252446:... |
| 935 | 25 | 10012 | XM23423234 | 11:23:56 22/08/2014 | 11:28:03 22/08/2014 | 250000:2014-08-22 11:23:56;250024:2014-08-22 11:24:03;250280:2014-08-22 11:24:20;250160:2014-08-22 11:24:42;252446:... |
| 936 | 25 | 10005 | XH45465676 | 11:24:11 22/08/2014 | 11:30:56 22/08/2014 | 250000:2014-08-22 11:23:45;250024:2014-08-22 11:24:03;250280:2014-08-22 11:24:20;250160:2014-08-22 11:24:42;252446:... |

Fig. 8 Linking audio files with visual transcripts

RECORDING SYSTEM FOR GENERATING A TRANSCRIPT OF A DIALOGUE

INTRODUCTION

Field of the Invention

The invention relates to recording conversations between two or more people, to generate transcripts. Examples are conversations between a customer and a tele-services agent or a bank official.

Prior Art Discussion

It is common practice to record the audio of conversations between customers and agents where such conversations happen over the phone. However it is not always possible or legal to record person-to-person conversations. Even where audio recording is possible the full extent of the interactions may not be captured.

US2014/0244252 (Koemei) describes a system which performs automatic speech recognition and uses documents exchanged during a meeting to improve quality of speech recognition.

U.S. Pat. No. 8,255,923 (Avaya) describes combining and integrating communication events conducted through diverse communication modes into a single conversation. A conversation object representing a conversation is generated.

US2006/0074623 (Tankhiwale) describes a system which employs speech recognition to automatically generate transcripts.

The invention is directed towards automatically capturing more comprehensive information about interactions, for example, so that business processes and customer service can be improved.

SUMMARY OF THE INVENTION

According to the invention, there is provided a recording system comprising:
- a listener processor configured to automatically monitor and capture events in a user computer as applications are used during a dialogue between the user and another party, and
- a server configured to automatically save events captured by the listener processor, wherein, said events including user computer screen transitions, data inputted by the user, event times, dialogue start events, and dialogue end events, and
- wherein the system comprises a transcript generator configured to apply each captured event to a timeline, and to generate a visual transcript representing the events on the timeline.

In one embodiment, the listener processor is also configured to automatically capture one or more of:
- retrieved customer data,
- dialogue duration,
- computer application opening or first user access for a dialogue, and/or
- computer application closing or last user access for a dialogue.

In one embodiment, the listener processor is configured to capture events arising from use of a dedicated computer application and to execute in parallel with other listener processors recording data from other computer applications.

In one embodiment, the listener processor is configured to detect an event and to then automatically determine if it is in a category of events to capture.

In one embodiment, the listener processor is configured to automatically identify a dialogue start event by detecting an event including when the user brings the dialogue party into session on a computer application or dials the dialogue party's phone number, or answers a dialogue party's phone call.

In one embodiment, the listener processor is configured to automatically identify a dialogue end event by detecting when the user brings the dialogue party out of session on a computer application or ending of a phone call to the dialogue party. Preferably, the transcript includes captured words.

In one embodiment, the transcript generator is configured to apply an icon to a specific event. Preferably, the listener processor is configured to record, as a dialogue, events which occur before, during and after a dialogue.

In one embodiment, the listener processor is configured to extract data from a user computer by performing one or more of:
- monitoring the computer operating system to detect low level mouse and keyboard events generated by the operating system when a user interacts with it,
- interfacing with application programming language of the user computer to detect higher level mouse and keyboard events coming from the computer applications, and optical character recognition to extract data from a computer application.

In one embodiment, the listener processor or the server are configured to automatically determine a meaning of each captured interaction event. Preferably, the listener processor or the server are configured to determine said meaning by performing a look-up to a table associating event identifiers and associated meanings.

In one embodiment, the listener processor or the server are configured to store event identifiers and their corresponding meanings in separate database tables.

In one embodiment, the listener processor is configured to provide a timestamp which identifies the date and time a captured event occurred. Preferably, the listener processor or the server are configured to automatically connect two or more captured events. In one embodiment, the listener processor or the server are configured to connect a trail of captured events in a sequence, in which length of a trail event sequence is not known until the system saves data for a dialogue interaction to a database.

In one embodiment, the listener processor or the server are configured to store 1 to N key value pairs for captured events whereby the exact length of a sequence of events is not known until the server saves an interaction.

The system is configured to provide in the transcript a display of the total duration of the dialogue.

In one embodiment, the system is configured to provide in the transcript a display of a timeline of the exact time a particular interaction the user has with the computer applications involved in the dialogue.

In one embodiment, the system is a configured to provide in the transcript a display of a flow of keywords taken from the computer applications that clearly indicate what the user did in the customer applications.

In one embodiment, the system is configured to provide in the transcript a display of a flow of the computer applications used during the dialogue and which match the flow of keywords.

In one embodiment, the system is configured to provide in the transcript a display of a visual image to present key steps in the flow, said visual image or icon being visually coded to enhance viewer understanding of that key step.

In one embodiment, the system is configured to associate audio clips with events. Preferably, the system is configured to tag a dialogue timeline, and to link said tags with audio clips. In one embodiment, the system is configured to perform user searches for audio clips according to said tags. In one embodiment, the system is configured to tag a dialogue using meta-data including application events and screen transitions.

In one embodiment, the system is configured to store recorded visual transcripts in a table format including an identifier, a start time for an interaction, and a delimited list of meta-data that represents the captured events, and wherein the system is configured to search through a transcript for criteria including time, user identifiers, and event meta-data and to then search an audio recording table with clips tagged with corresponding meta tags.

In one embodiment, the system is configured to automatically generate a summary transcript of summary events related to said dialogue events. Preferably, the system is configured to generate said summary events in real time as events are captured. In one embodiment, the system is configured to store a sequence of events as they occur, each one time-stamped to ensure that the sequence is maintained, and to also apply a trail meta tag to selected events according to event category, and to automatically group events out of time sequence according to said trail meta tags. In one embodiment, the system is configured to automatically generate a transcript in any of a plurality of different natural languages.

In another aspect, the invention provides a method of operation of a recording system comprising a listener processor and a server, the method comprising:
  the listener processor automatically monitoring and capturing events in a user computer as applications are used during a dialogue between the user and another party, and
  the server automatically saving events captured by the listener processor, wherein, said events include user computer screen transitions, data inputted by the user, event times, dialogue start events, and dialogue end events, and
  the system applying each captured event to a timeline, and generating a visual transcript representing the events on the timeline.

In one embodiment, the listener processor automatically captures one or more of:
  retrieved customer data,
  dialogue duration,
  computer application opening or first user access for a dialogue, and/or
  computer application closing or last user access for a dialogue.

In one embodiment, the listener processor captures events arising from use of a dedicated computer application and executes in parallel with other listener processors recording data from other computer applications. In one embodiment, the listener processor detects an event and then automatically determines if it is in a category of events to capture.

In one embodiment, the listener processor automatically identifies a dialogue start event by detecting an event including when the user brings the dialogue party into session on a computer application or dials the dialogue party's phone number, or answers a dialogue party's phone call, and automatically identifies a dialogue end event by detecting when the user brings the dialogue party out of session on a computer application or ending of a phone call to the dialogue party. In one embodiment, the transcript includes captured words, and the transcript generator applies an icon to a specific event.

In one embodiment, the listener processor extracts data from a user computer by performing one or more of:
  monitoring the computer operating system to detect low level mouse and keyboard events generated by the operating system when a user interacts with it,
  interfacing with application programming language of the user computer to detect higher level mouse and keyboard events coming from the computer applications, and
  optical character recognition to extract data from a computer application.

In one embodiment, the listener processor or the server automatically determine a meaning of each captured interaction event, by performing a look-up to a table associating event identifiers and associated meanings. Preferably, the listener processor or the server store event identifiers and their corresponding meanings in separate database tables.

In one embodiment, the listener processor provides a timestamp which identifies the date and time a captured event occurred. In one embodiment, the listener processor or the server automatically connect two or more captured events, and connect a trail of captured events in a sequence, in which length of a trail event sequence is not known until the system saves data for a dialogue interaction to a database.

In one embodiment, the listener processor or the server store 1 to N key value pairs for captured events whereby the exact length of a sequence of events is not known until the server saves an interaction.

In one embodiment, the system provides in the transcript a display of total duration of the dialogue, and provides in the transcript a display of a timeline of the exact time a particular interaction the user has with the computer applications involved in the dialogue.

In one embodiment, the system provides in the transcript a display of a visual image to present key steps in a dialogue, said visual image or icon being visually coded to enhance viewer understanding of the key steps.

In one embodiment, the system associates audio clips with events, and tags a dialogue timeline, and links said tags with audio clips, and performs user searches for audio clips according to said tags. Preferably, the system tags a dialogue using meta-data including application events and screen transitions.

In one embodiment, the system stores recorded visual transcripts in a table format including an identifier, a start time for an interaction, and a delimited list of meta-data that represents the captured events, and wherein the system searches through a transcript for criteria including time, user identifiers, and event meta-data and then searches an audio recording table with clips tagged with corresponding meta tags.

In one embodiment, the system automatically generates a summary transcript of summary events related to said dialogue events. In one embodiment, the system generates said summary events in real time as events are captured.

In one embodiment, the system stores a sequence of events as they occur, each one time-stamped to ensure that the sequence is maintained, and also applies a trail meta tag to selected events according to event category, and automatically groups events out of time sequence according to said trail meta tags.

In another aspect, the invention provides non-transitory computer readable medium comprising software code configured to perform the steps of a method as defined above in any embodiment when executing on a digital processor.

Additional Statements

According to the invention, there is provided a recording system comprising:
  a listener processor adapted to monitor and capture events in a user computer as applications are used during a conversation involving the user, and
  a server for saving events captured by the listener processor.

In one embodiment, the listener processor is arranged to capture one or more of:
  user computer screen transitions,
  inputted customer data,
  retrieved customer data,
  conversation duration,
  event times,
  end events and start events,
  application opening or first user access, and/or
  application closing or last user access.

In one embodiment, the listener processor is adapted to store a set of events that are specified in a configuration as being in a category to capture, or are only categorised after being captured.

In one embodiment, the listener processor is adapted to record data from one or more computer applications, or multiple listener processors are dedicated to each computer application.

In one embodiment, the listener processor has the ability to record data from multiple computer applications and/or to run in parallel with other listener processors recording data from other computer applications.

In one embodiment, the listener processor is adapted to monitor events and to filter out those which are not in a configured set of events.

In one embodiment, the listener processor is adapted to automatically identify start of a particular conversation by detecting an event including when the user brings a customer into session on the computer application or dials the other party's phone number or answers the other party's phone call.

In one embodiment, the listener processor is adapted to automatically identify end of a particular conversation by detecting an event including when the user brings a customer out of session on the computer application or hangs up after a phone call to the other party is finished.

Preferably, the system has a transcript generator adapted to apply each detected and relevant event to a timeline, and for generating a visual transcript representing the events on the timeline. In one embodiment, the event representations include captured words. In one embodiment, the transcript generator is adapted to apply an icon to a specific event.

In one embodiment, the listener processor is adapted to record, as a conversation, events before, during and after communication between the parties.

In one embodiment, the listener processor is adapted to extract data from a user computer system by performing one or more of:
  monitoring the operating system to detect low level mouse and keyboard events generated by the operating system when a user interacts with it,
  hooking into the application programming language of the computer to detect higher level mouse and keyboard events coming from the computer applications, and
  optical character recognition to extract data from the computer application.

In one embodiment, the listener processor is adapted to provide a unique identifier that identifies a meaning of each interaction.

In one embodiment, the listener processor is adapted to provide a timestamp which identifies the date and time an event occurred.

In one embodiment, the listener processor or the server are adapted to connect two or more events. Preferably, the listener processor or the server are adapted to connect events depending on the duration of a conversation and the number of applications the user interacted with during the conversation, whereby the exact length of a trail event sequence is not known until the system saves the interaction to the database.

In one embodiment, the listener processor or the server are adapted to use a separate table to contain event identifiers and their corresponding meanings. In one embodiment, the meanings are automatically generated by the system.

In one embodiment, the system is adapted provide in the visual transcript:
  a display of the total duration of the conversation, and/or
  a display of a timeline of the exact time a particular interaction the user has with the computer applications involved in the conversation with the customer, and/or
  a display of a flow of the exact keywords taken from the computer applications that clearly indicate what the user did in the customer applications, and/or
  a display of a flow of the exact computer applications used during the conversation that matches the flow of the keywords, and/or
  a display of a visual image or icon to present key steps in the flow.

In one embodiment, the listener processor is adapted to connect two or more of these elements depending on the duration of the conversation and the number of systems the user interacted with during the conversation, in which the length of the trail event sequence is not known until the system saves the interaction to the database.

In one embodiment, a separate table is used to contain all the event identifiers and their corresponding meanings.

In another aspect, the invention provides a computer readable medium comprising software code adapted to perform the steps of a system as defined above in any embodiment when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

A recording system of the invention automatically generates a visual transcript of a conversation between a user and a customer in which the user interacts with a computer system during that conversation.

There are many situations in service industries such as financial services, insurance, and utilities for example where a user (such as a tele-services agent or bank official for example) has a conversation with a customer either face-to-face or over the phone, and the user uses a range of computer applications on their computer system during that conversation. The recording system of the invention automatically records these interactions, not only by voice recording but rather by recording the actual use by the user with the computer applications. A visual representation of this recording of a conversation is generated, called a "visual transcript", advantageously providing immediate feedback to the user or supervisor of what actually happened during a conversation in terms of their direct use of the computer applications involved in the call.

These transcripts may be advantageous for various reasons such as future training, as the transcripts are retrievable and viewable at any future time. The contents of the visual transcripts are idea inputs for data mining and data analytic engines.

The recording system in various embodiments records the actual usage of computer applications whenever a user has a conversation with a customer. The conversation between the user and the customer may be face-to-face or over the phone. Also, the recording is made for a period which includes one or more of:

prior to the conversation taking place,
during the conversation, and
after the conversation ends.

Hence it may cover the full period which applies to the dialogue or conversation in which the user interacts with one or more computer applications that relate directly to performing some series of functions for that customer.

The recording system records all of the user interactions with the computer applications used during the conversation and at the end of the conversation stores information which can be used to generate a visual transcript which is retrievable and viewable at any future time. This may be displayed to the user at the end of the conversation or at a later date for training and coaching.

Figure 1:
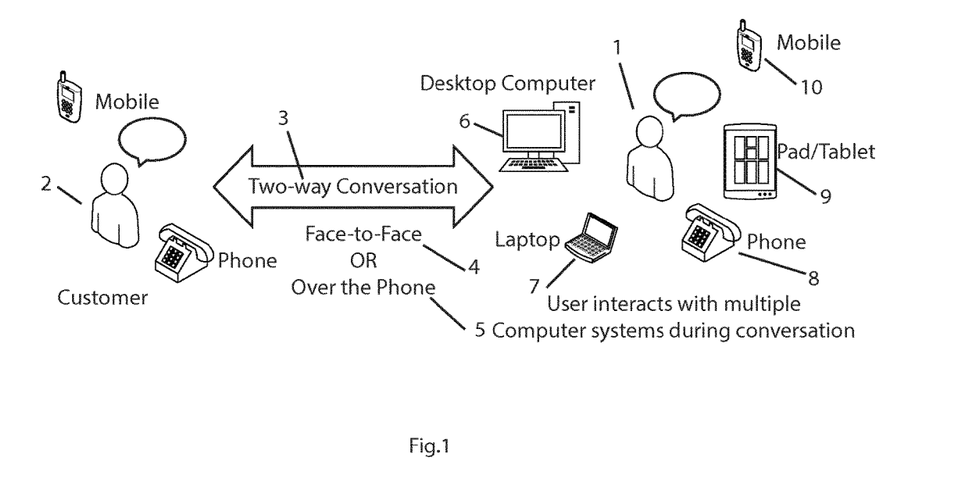
FIG. 1 is a diagram illustrating elements used during a conversation between a customer and an agent, either face-to-face or over the phone.
Figure 2:
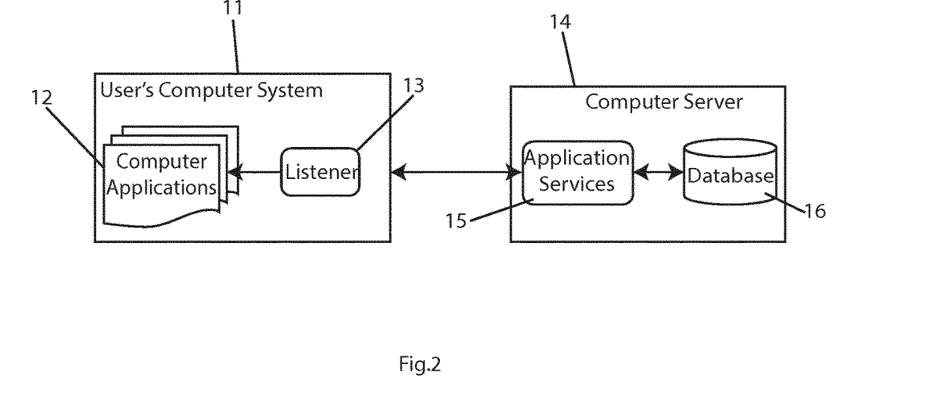
FIG. 2 is a block diagram showing the major components of a recording system of the invention.

FIG. 1 is a diagram showing the user and customer having a dialogue either face-to-face or over the phone and interacting with various computer systems. FIG. 2 is a block diagram showing the components of the system. A user computer system 11 has a digital processor executing software applications 12. A listener software application 13 of the recording system is linked with application services 15 on a back-office server 14 with a database 15. Embodiments of the invention work in any two-way conversation 3 which can be either a face-to-face conversation channel 4 or a phone conversation channel 5 and where the user uses multiple computer devices and computer applications (6, 7, 8, 9 and 10) during that conversation. Interaction data is data that relates to aspects of the interaction between the user devices (6, 7, 8, 9 and 10) and the user 1 through all channels that have occurred.

On each user's computer system 11, the user can use 1 to N computer applications 12. The (computer application processor) listener 13 is configured to extract keywords and customer data from each application 12 used by the user during the dialogue.

The listener 13 automatically exacts data from the computer system by using automatic processing techniques, including:

monitoring the operating system to detect low-level mouse and keyboard events generated by the operating system when a user interacts with it, and/or hooking into the application programming language of the computer systems to detect higher level mouse and keyboard events coming from the computer applications, and/or using optical character recognition (OCR) techniques to extract data from the computer application.

The listener is customized and changed based on the configuration and capabilities of the computer applications. The adaptability of the listener is a key feature that allows the system to build visual transcripts across multiple computer systems and applications. In some cases more than one technique is used to retrieve and/or compute the correct data in order for the system to create a visual transcript of the interaction between the user and the client. The listener 13 executes alongside the computer applications 12. As the user interacts with the applications 12, the listener 13 captures events and screen transitions that occur in the applications 12. At the end of each conversation the interaction data is stored on the central server 14, on which runs a series of application services 15 that store and retrieve the recorded transcript into a database 15. The interaction data is stored in a table on the database as follows:

```
'id' int,
'trailId' int,
'userId' string,
'customerUniqueId' string,
'customerOtherId' string,
'customerName' string,
'trailStartTime' datetime,
'trailEndTime' datetime,
'startTrailEventId' int,
'stopTrailEventId' int,
'trailEventSequence' text
'eventData' text
```

The key column in this table is the trailEventSequence which holds the entire interaction that took place during a conversation between the user and a customer. For example, an entry in the table for one such conversation is as follows:

250000: 2014-10-13 05:20:33; 250024: 2014-10-13 05:20:33; 250280: 2014-10-13 05:20:42; 250160: 2014-10-13 05:20:42; 252446: 2014-10-13 05:20:50; 252448: 2014-10-13 05:22:49; 252450: 2014-10-13 05:22:50; 252452: 2014-10-13 05:22:52; 252466: 2014-10-13

```
05:22:54; 252470: 2014-10-13 05:22:57; 252478: 2014-10-13 05:22:57; 252494: 2014-10-13
05:22:59; 252498: 2014-10-13 05:23:01; 252512: 2014-10-13 05:23:03; 252514: 2014-10-13
05:23:05; 252526: 2014-10-13 05:23:07; 252528: 2014-10-13 05:23:09; 252538: 2014-10-13
05:23:10; 252542: 2014-10-13 05:23:12; 252592: 2014-10-13 05:24:52; 252594: 2014-10-13
05:24:54; 252596: 2014-10-13 05:24:55; 252620: 2014-10-13 05:24:57; 252624: 2014-10-13
05:24:59; 252642: 2014-10-13 05:25:01; 252650: 2014-10-13 05:25:03; 252654: 2014-10-13
05:25:04; 252672: 2014-10-13 05:25:06; 252680: 2014-10-13 05:25:08; 252684: 2014-10-13
05:25:09; 252704: 2014-10-13 05:25:11; 252706: 2014-10-13 05:25:12; 252722: 2014-10-13
05:25:13; 252724: 2014-10-13 05:25:15; 252726: 2014-10-13 05:25:16; 252746: 2014-10-13
05:25:18; 252754: 2014-10-13 05:25:19; 252760: 2014-10-13 05:25:20; 252776: 2014-10-13
05:25:21; 252784: 2014-10-13 05:25:23; 252790: 2014-10-13 05:25:25; 252796: 2014-10-13
05:25:26; 252804: 2014-10-13 05:25:27; 252810: 2014-10-13 05:25:30; 252828: 2014-10-13
05:25:31; 252834: 2014-10-13 05:25:32; 252836: 2014-10-13 05:25:33; 252838: 2014-10-13
05:25:36; 252858: 2014-10-13 05:25:38; 252866: 2014-10-13 05:25:39; 252872: 2014-10-13
05:25:41; 252888: 2014-10-13 05:25:43; 252892: 2014-10-13 05:25:44; 252898: 2014-10-13
05:25:46; 252916: 2014-10-13 05:25:48; 252922: 2014-10-13 05:25:48; 252924: 2014-10-13
05:25:50; 252940: 2014-10-13 05:25:52; 252948: 2014-10-13 05:26:05; 252952: 2014-10-13
05:26:08; 252970: 2014-10-13 05:26:09; 252978: 2014-10-13 05:26:10; 252980: 2014-10-13
05:26:13; 252986: 2014-10-13 05:26:14; 252994: 2014-10-13 05:26:15; 252996: 2014-10-13
05:26:17; 252998: 2014-10-13 05:26:19; 253008: 2014-10-13 05:26:20; 253012: 2014-10-13
05:26:22; 253020: 2014-10-13 05:26:23; 253022: 2014-10-13 05:26:25; 253032: 2014-10-13
05:26:25; 253034: 2014-10-13 05:26:27; 253044: 2014-10-13 05:26:28; 253046: 2014-10-13
05:26:30; 253056: 2014-10-13 05:26:31; 253058: 2014-10-13 05:26:33; 250001: 2014-10-13
05:27:22;
```

The trailEventSequence is a text delimited (;) list of events that occurred during the conversation. Each element is defined as follows:

trailEventId:timestamp; trailEventId:timestamp; trailEventId:timestamp . . .
   where the trailEventId occurred is a unique identifier that clearly identifies the exact interaction.

For example, 25000 is the unique identifier for identifying that the user just started a conversation with a customer. The timestamp clearly identifies the exact date and time that this event occurred. A full interaction could connect two or more of these elements depending on the duration of the conversation and the number of systems the user interacted with during the conversation. Therefore, the exact length of the trail event sequence is not known until the system saves the interaction to the database.

The system automatically uses look-up tables to determine a meaning for at least some of the events. Separate tables are used to contain all the trailEventIds and their corresponding meanings. By linking the event identifiers and their associated meanings in this manner the system has versatility to add additional links for example, additional for natural languages.

The eventData is a list of customer or application data that was displayed on the application screen during that conversation and which the system is configured to record. For example, the eventData may be populated as follows for storing key customer data that was visible on the application screen at the time the event was recorded:
   customerDOB=27/12/1971;customerSex=Male;
      customerRegion=New York
   Each element of eventData is defined as follows:
   dataKeyName1=dataValue1;
      dataKeyName2=dataValue2;

The system can store 1 to N key value pairs and therefore the exact length of the eventData is not known until the system saves the interaction to the database.

Figure 3:
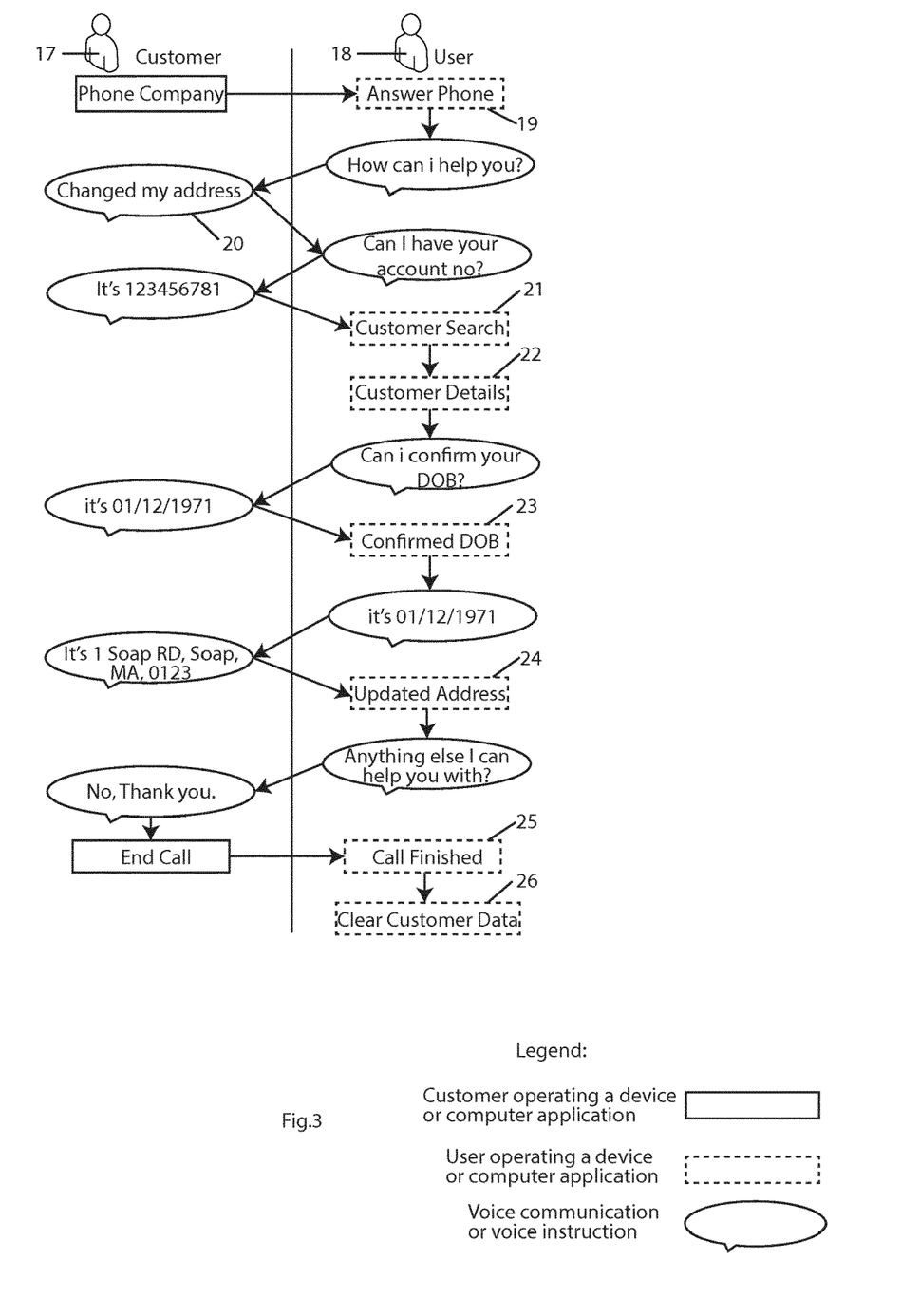
FIG. 3 is a flow diagram of a conversation on a timeline.
Figure 4:
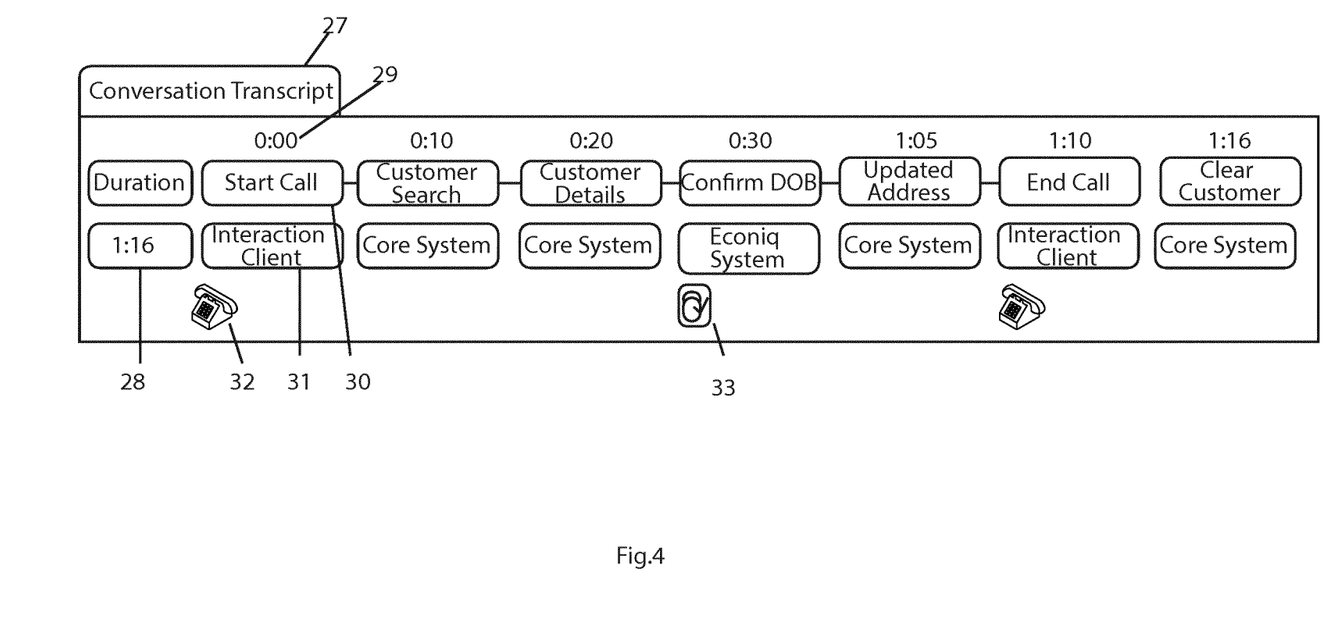
FIG. 4 is a visual transcript representation of this conversation as generated by the recording system.
Figure 5:
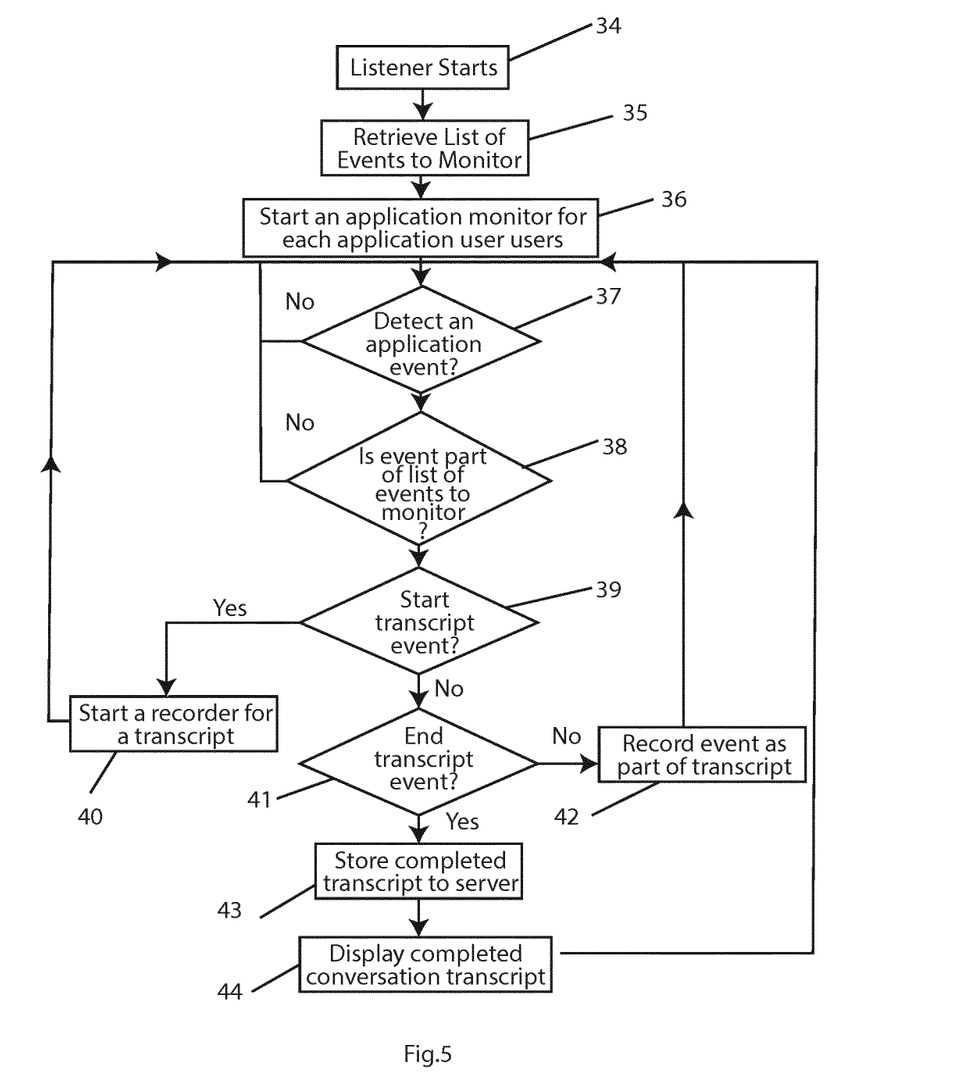
FIG. 5 is a flow diagram for method of operation of the recording system.

FIG. 3 is a flow diagram showing a simple transcript for a conversation between a user and a customer and the user's interaction with the computer applications on the computer system they are using. FIG. 4 is a visual representation of the transcript recording of this conversation. FIG. 5 is a flow diagram showing the logic executed by the digital processor of the system.

Every time the user uses a computer application during the conversation with a customer the listener 13 extracts the keywords from the computer application to determine where the user is within the application and what they have done within the application. It also extracts data about the customer from the customer application, such as the customer's name, contact details and other displayed customer data. The system records these keywords and customer data within a record, and this is used to immediately generate the visual transcript such as that shown in FIG. 4. Alternatively, the visual transcript may be generated later and only shown when actually requested by the users or by automated systems such as data mining and/or analytic engine, or by a coach when training or mentoring the user at a later date. This transcript record of the conversation presents exactly what the user did for a customer by analysing the user's direct interaction with the computer applications 12.

In some embodiments of the invention, the visual transcript comprises:
   An overall indication of the duration of the conversation between the customer and the user.
   A timeline of the exact times of interactions with the computer applications 12.
   A flow of the keywords taken from the computer applications 12 that indicate what the user did in the customer applications. The flow matches exactly to the timeline previously shown.
   A flow of the computer applications 12 used during the conversation, which matches the flow of the keywords previously shown.
   A visual image or icon to present key steps in the flow. These icons match the flow in the previous part but are only shown where key steps such as a compliance step had occurred.
   Colours are used to highlight the key steps automatically identified by the system in a transcript. Colours are applied to the visual image or icon to as a visual indicator that when a person views a transcript they can identify the important aspects of the transcript by examining the colours applied to the key steps in the transcript. In one embodiment t the following colours are applied to the visual transcripts automatically by the transcript engine:

Green—points in the transcript where a particular type of conversation with the customer is taking place.

Red—points in the transcript where a compliance step has been taken with indications within the coloured icon if the compliance step was correctly handled or incorrectly handled.

Purple—points in the transcript where an opportunity to make an additional outcome in the conversation such as a referral or additional sale (if the sale is used in a selling environment).

Blue—da-to-day steps in the transcript that directly relate to the standard steps in the normal business process that the transcript engine is generating transcripts for.

The visual indicators are not necessarily colours. They may for example be different sized fonts or a blinking display. The presentation of this information may take any desired form, and the form per se is not part of the invention. An advantageous aspect of the invention is however that the system of the invention automatically identifies events in the dialogue and applies them to the visual transcript in a manner in which they are highlighted for enhanced visibility.

The system may be arranged for storage of these recorded transcripts so that they can be retrieved at a future time and re-displayed for user training and user coaching to improve a user's ability to have better and more meaningful conversations with a customer.

In the example of FIG. 3 a customer 17 calls their financial services company to inform them of a recent address change. The user 18 answers the phone and starts the conversation with the customer 17. When the user 18 interacts 19 directly with a device or computer application then the listener 13 records this interaction as a set of keywords that describe what happened in the computer application 12. As voice communication or voice instructions 20 are passed between the customer 17 and the user 18, the listener 13 records of all the key application 12 events and transitions that allow the user 18 to complete the required voice instructions issued by the customer 17. All of the user 18 interactions with the applications 12 in this example (19, 21, 22, 23, 24, 25 and 26) are recorded as part of the interaction data for the conversation transcript.

FIG. 4 is a visual transcript 27 as recorded and displayed by the listener processor 13 for the example described in FIG. 3, named a "Conversation Transcript". It is automatically displayed at the end of the conversation by the listener processor 13. The visual transcript 27 is made up of the six parts described above. The first of these parts is the calculated duration of the conversation, and it is displayed at location 28 of the visual transcript. The second part is a layout of the exact timeline 29 of each element or user interaction with the computer applications 12 during the conversation. Below the timeline 29 is the third part of the visual presentation, the exact keywords 30 taken from the applications 12 that clearly indicate what the user did in the applications. Below this again is the fourth part of the visual transcript, the exact applications 31 of the full set 12 used during the conversation that matches the flow of the keywords.

Below that again is the final two parts, a visual image or icon 32 to present key steps in the flow. These icons match the flow in the previous part but are only shown where key steps such as a compliance step had occurred. The icon will also be coloured red to clearly indicate that it is a compliance step. For example in FIG. 4 a key step in the transcript is a compliance step 33 which occurred during the conversation, in which the user clearly indicated that the customer was verified using their date of birth (DOB).

As noted above, the listener engine or processor 13 discreetly listens for events and screen transitions that occur within the applications that the user uses during the conversation with the customer. FIG. 5 is a flow diagram that describes the logic executed by the listener 13 for automatically recording the events and generating the visual transcript. When a user starts their computer applications, the recording system starts its listener 34. The listener 34, as part of its initialization, retrieves a list of events and transitions 35 that it should capture for each computer application. The listener 34 then starts a separate monitor 36 for each computer application it must monitor for events and transitions. Once the monitor 36 is activated it starts analysing events and transitions from the computer application it is targeted to monitor. When the monitor detects an event 37 from the computer application it automatically determines in step 38 if it is of a category for a transcript. If it is, then the monitor checks to see if it is a start event 39. If it is a start event 39 then the listener will trigger the start of recording a conversation transcript 40. An example of a start event might be when the user first brings the customer's record into session on the computer application they are using. It could also be when the user dials the customer's contact number or if the customer calls the user's business contact number. If it is not a start event 39 then the monitor checks to see if the event is an end event 41. An example of an end event might be when the user hangs up or finishes the call with the customer, or it might be when the user brings the customer out of session in the computer application they are using. If it is not an end event 41 then the listener records the event as part of the sequence of events 42 to be recorded as part of the transcript. If the event is an end event 41 then the listener will trigger a service to store the completed transcript to the server 43. The listener will also trigger a display of the transcript 44 using the visual presentation.

In one embodiment, the recording system has the ability to link recorded transcripts with an actual audio recording of the conversation. This provides the ability to search the visual transcript system for specific conversation tags (such as application events, screen transitions and customer data) using the visual transcript engine and to then link that transcript directly to the recorded audio file. Managers, auditors and coaches no longer need to sample audio files to determine if certain events or items were done in the conversation, but rather they can drill down and find the actual audio recordings that contain or don't contain those tags that the visual transcript has recorded in parallel with the audio recording system.

Figure 8:
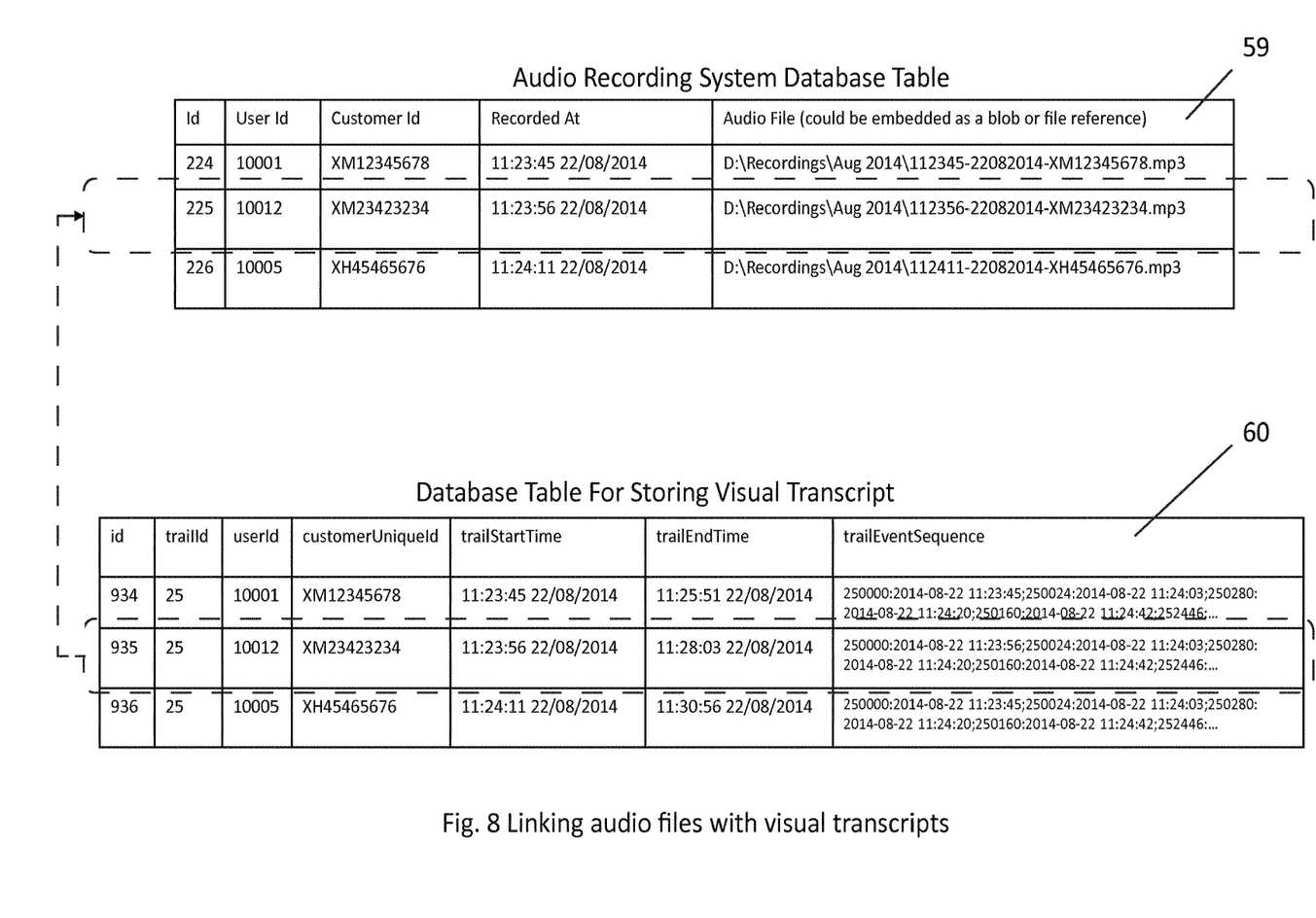
FIG. 8 is a diagram illustrating linking of a visual transcript table to an audio recording table.

The visual transcript engine tags the conversation using meta-data (such as application events, screen transitions and customer data) along with the exact timeline of the conversation to allow the audio recording system files to be directly linked and made searchable through the visual transcript recording system. FIG. 8 describes the table format 59 of an audio recording system which records the details of stored audio files recorded between a user and a customer on a phone system in a database table. The system stores its recorded visual transcripts in a table format 60 as described above and partially shown in FIG. 8. For example, an audio recording system may have recorded an audio file of a phone conversation between user 10012 and customer XM23423234 at 11:23:56 on the 22 Aug. 2014. The software of the system which was installed and operating on the user's computer system would have recorded all of the interactions the user had within the computer application during that phone conversation. The system has recorded these computer application interactions recording the userId, customer's unique id, the time the interaction started (when the call was received from the customer) and the trailEventSquence which is a delimited list of all the meta-data that represent application events captured during the length of the phone call.

The system allows for the integration of the audio recording system with the visual transcript engine such that searches through the visual transcripts for certain criteria such as date-time, user, customer and application event meta-data. The fact that the visual transcript records actual application events and customer data allows for transcripts to be searched based on these events and data in a targeted search and retrieval of the exact audio recording files. A user no longer needs to sample audio files to ensure that a user is compliant in the conversation they had with a customer. They can target specific audio recordings based on the filtered or searched visual transcripts that contain or don't contain specific application events. For example, in an interaction that recorded the display of a particular compliance prompt and the user's answer to that prompt, both of these events would be recorded. A user could then search the visual transcripts for records where the compliance prompt was displayed as this is a recorded application event. The system can then directly retrieve the associated audio files where that prompt was shown.

In one embodiment, the system has a transcript summary generator. For every visual transcript that is generated a transcript summary is also generated in real-time. The transcript summary is used to provide a quick overview of a detailed transcript allowing the user or computer system to determine if the entire transcript is of importance and should be examined further. This is illustrated in FIG. 6, steps 50 to 52.

Also, in one embodiment, the recording system post-processes the visual transcript before it is stored on the server and displayed to the user, to ensure that certain events or a set sequence of events occur one after another so that the cause and effect of a particular event can be clearly seen within the recorded transcript.

The display of the detailed transcript can be toggled to display the transcript in a different foreign language.

Figure 6:
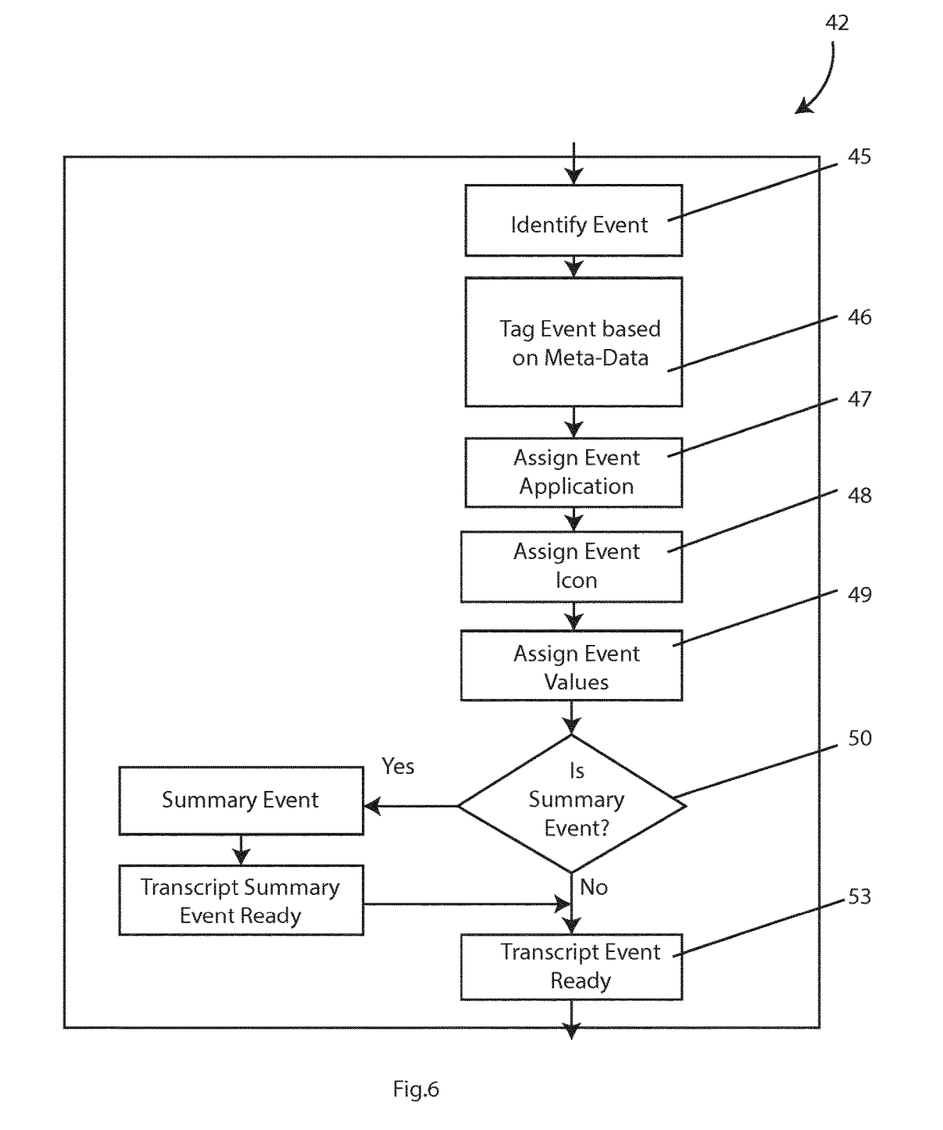
FIGS. 6 and 7 are flow diagrams illustrating steps of the method of FIG. 5 in more detail.

FIG. 6 is a diagram that further extends element 42 in FIG. 5. As events 42 occur in the various applications that the listener detects the visual transcript engine tags 46 the events based on the meta-data it has been configured to listen out for. Once the listener 13 has determined that the event is important and should be recorded as part of the transcript the engine first identifies which application event 47 the event is part of. It then assigns the icon 48 that visually represents that event and then assigns various values 49 to that event. The values assigned are an indication of the importance of the event in the transcript. Examples of event values are
the event is a compliance event,
the event is an enhanced customer experience event,
the event is a revenue generating event like a product sale, and/or
the event is a productivity event.

Additional values can be added through the system configuration. The transcript engine which is part of the listener 13 then determines 50 if the event is a summary event 51. If so, than that event is recorded as part of the transcript summary 52. Once the event is fully processed the engine returns to handling the next event. In more detail, the transcript engine 13 recognises an event as a summary event by testing each identified event 49 to see if the event is a summary event 51. In one example configuration an event is categorized as a summary event if it is a compliance event, an enhanced customer experience event, a revenue-generating event or a productivity event. If the event is categorized as a summary event, then the transcript summary event 52 for that particular summary event is marked as activated for that transcript.

When an end event 41 (in FIG. 5) is triggered the system, before it stores the transcript on the server, post-processes the transcript. The system stores the exact sequence of application events as they occur, each one time-stamped to ensure that the sequence is correct. However, when displaying the transcript to the user it is often required to group certain events together for visual purposes so that it is easier for the user to see a direct cause and effect of doing certain application events. The post-processing automatically groups certain events together so that the cause and effect of certain events can be more easily seen within the visual transcript by the user. For example, if during the interaction a compliance prompt was displayed to the user and a required answer was recorded but a sequence of events occurred within the showing of the prompt and when the user actually answering the prompt, the transcript post-processor brings those connected events together so that when the transcript is displayed those events are displayed side by side. It is therefore easier for the user to link the fact that the events in the transcript sequence are connected. The trail event or meta-data that is assigned to each application event during system configuration assigns them in such a way that certain events can be easily grouped together. This makes it possible for the post-processor to automatically group certain applications events regardless of when they actual occurred within the transcript.

Figure 7:
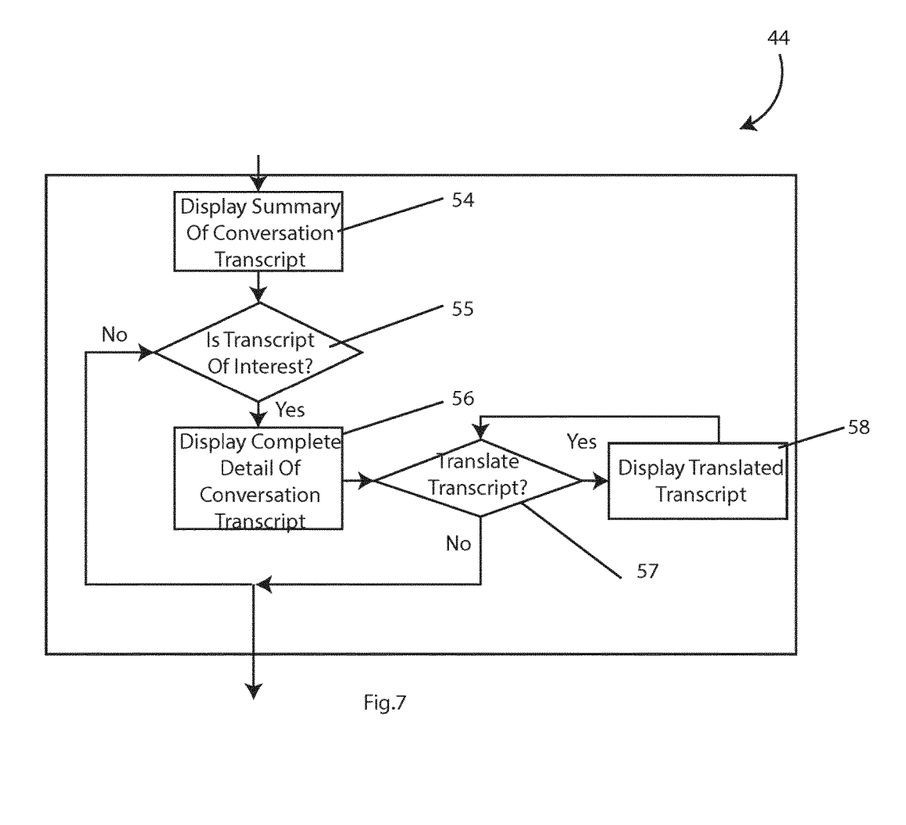

When the end event has being detected and the transcript is displayed (44), a summary of the transcript is displayed initially. FIG. 7 shows the steps executed by the processor when displaying transcripts. A summary 54 is initially displayed on the detection of end of a conversation. If the conversation transcript is of interest (55) based on the real-time summary built during the recording of the transcript then the system can open the full detailed transcript 56. A transcript summary may contain important elements that this configuration deemed important. If a user or computer system sees or detects these important elements within the summary, they can then determine if the detail of the transcript should be examined. A detailed transcript may be opened based on what was detected or shown in the transcript summary.

As shown in FIG. 7, the system can be used to display the detailed transcript in a different foreign language. When the default detailed transcript is displayed (56) it will be displayed in the default locale that the system is initialized to. The user can toggle (57) to the language that they prefer to see the transcript in (58). The system is initialized to handle 1-N number of foreign languages.

In various aspects the recording system of the invention provides a listener processor configured for obtaining a list of computer application events and transitions that should be recorded. This processor is preferably configured for extracting keywords and customer data from these computer application events and screen transitions, and for recording the computer application events and transitions as a transcript which can be stored. Preferably, it is configured to send the recorded transcript to a remote server for storage on a database.

Advantageously, the recording system generates a visual transcript which:
- displays the total duration of the conversation, and/or
- displays a timeline of the exact time a particular interaction the user has with the computer applications, and/or
- displays a flow of the exact keywords taken from the computer applications that clearly indicate what the user did in the customer applications, and/or
- displays a flow of the exact computer applications used during the conversation that matches the flow of the keywords, and/or
- displays a visual image or icon to present key steps in the flow.

The recording system may as outlined above have an application server including one or more of:
- an inventory module configured for managing determination of appropriate events and transitions that the listener processor should monitor;
- a collection module configured for collecting a recorded transcript;
- a database configured for storing the recorded transcript;
- a retrieval module configured for retrieving one or more recorded transcripts based on certain search criteria.

The system advantageously has the ability to search for one or more stored transcripts, and the found transcripts can be re-displayed in their visual representation form.

It will be appreciated that the invention provides for automatically capturing events and generating a transcript in an environment which has heretofore been regarded as not being amenable to such automatic recording. Heretofore, the approach has been to automatically log computer activity such as edits to a database, or to manually record human conversations. The invention bridges the two sets of activities to provide for an automatically-generated transcript of events.

The invention is not limited to the embodiments described but may be varied in construction and detail.

The invention claimed is:

1. A transcript generating system comprising:
    a listener processor configured to:
        (a) automatically detect events in a user computer as computer applications executing on the user computer are used during a dialogue between the user and another party, said user events including user computer screen transitions, data inputted by the user, user interactions with the computer applications, dialogue start events, and dialogue end events, and in which said event detection includes a processor extracting data within the user computer by performing one or more of:
            monitoring the computer operating system to detect low level operating system mouse and keyboard events generated by the operating system when a user interacts with it,
            interfacing with a programming language code of said computer applications to detect higher level mouse and keyboard events generated from user interaction with said computer applications, and
            performing optical character recognition of a display screen to extract data from one or more of said computer applications,
        (b) automatically provide a timestamp which identifies the date and time a captured event occurred, and
        (c) automatically determine if a detected event is in a stored category of events to capture according to category definitions;
    a server configured to automatically save said events captured by the listener processor, and
    a transcript generator configured to apply each captured event to a timeline, and to generate a visual transcript representing the events on the timeline, and the visual transcript being in electronic form for display on a computer display screen for viewing by users;
    wherein the listener processor or the server are configured to automatically determine a meaning of each captured event by performing a look-up to a table associating event identifiers and associated meanings,
    wherein the transcript includes captured words,
    wherein the transcript generator is configured to apply a visual image to a specific event, said visual image being visually coded to enhance viewer understanding of that specific event,
    wherein the listener processor or the server are configured to automatically connect a trail of captured events in a sequence, in which length of a trail event sequence is not known until the system saves data for a dialogue interaction to a database; and wherein the listener processor or the server are configured to store 1 to N key value pairs for captured events whereby the exact length of a sequence of events is not known until the server saves an interaction, and
    wherein the processor applies a trail meta tag to selected events according to event category, and automatically groups events out of time sequence according to said trail meta tags.

2. The transcript generating system as claimed in claim 1, wherein the listener processor is also configured to automatically capture one or more of:
    retrieved customer data,
    dialogue duration,
    computer application opening or first user access for a dialogue, and/or
    computer application closing or last user access for a dialogue; and
    wherein the listener processor is configured to capture events arising from use of a dedicated computer application and to execute in parallel with other listener processors recording data from other computer applications; and
    wherein the listener processor is configured to detect an event and to then automatically determine if it is in a category of events to capture.

3. The transcript generating system as claimed in claim 1, wherein the listener processor is configured to automatically identify a dialogue start event by detecting an event including when the user brings a dialogue party into session on a computer application or dials the dialogue party's phone number, or answers a dialogue party's phone call;
    wherein the listener processor is configured to automatically identify a dialogue end event by detecting when the user brings the dialogue party out of session on a computer application or ending of a phone call to the dialogue party.

4. The transcript generating system as claimed in claim 1, wherein the system is configured to provide in the transcript a display of the total duration of the dialogue.

5. The transcript generating system as claimed in claim 1, wherein the system is configured to provide in the transcript a display of a flow of keywords taken from the computer applications that clearly indicate what the user did in the customer applications.

6. The transcript generating system as claimed in claim 1, wherein the system is configured to provide in the transcript a display of a flow of keywords taken from the computer applications that clearly indicate what the user did in the customer applications; and wherein the system is configured to provide in the transcript a display of a flow of the computer applications used during the dialogue and which match the flow of keywords.

7. The transcript generating system as claimed in claim 1, wherein the system is configured to associate audio clips with events to tag a dialogue timeline, and to link said tags with audio clips, and to perform user searches for audio clips according to said tags, and to tag a dialogue using meta-data including application events and screen transitions, and wherein the system is configured to store recorded visual transcripts in a table format including an identifier, a start time for an interaction, and a delimited list of meta-data that represents the captured events, and wherein the system is configured to search through a transcript for criteria including time, user identifiers, and event meta-data and to then search an audio recording table with clips tagged with corresponding meta tags.

8. The transcript generating system as claimed in claim 1, wherein the system is configured to automatically identify key events in said detected events, and to generate a summary transcript of said key events.

9. The transcript generating system as claimed in claim 1, wherein the system is configured to automatically generate a summary transcript of summary events related to said dialogue events; and wherein the system is configured to generate said summary events in real time as events are captured.

10. The transcript generating system as claimed in claim 1, wherein the system is configured to store a sequence of events as they occur, each one time-stamped to ensure that the sequence is maintained.

11. A method of operation of a transcript generating system comprising a listener processor, a transcript generator, and a server, the method comprising:

the listener processor:
(a) automatically detecting events in a user computer as computer applications executing on the user computer are used during a dialogue between the user and another party, said events including user computer screen transitions, data inputted by the user, event times, dialogue start events, and dialogue end events, and in which said event detection includes a processor extracting data within the user computer by performing one or more of:
monitoring the computer operating system to detect low level operating system mouse and keyboard events generated by the operating system when a user interacts with it,
interfacing with a programming language code of said computer applications to detect higher level mouse and keyboard events generated from user interaction with said computer applications, and
performing optical character recognition of a display screen to extract data from one or more of said computer applications,
(b) automatically providing a timestamp which identifies the date and time a captured event occurred, and
(c) automatically determining if a detected event is in a stored category of events to capture according to category definitions;

the server automatically saving said events captured by the listener processor; and the transcript generator applying each captured event to a timeline, and generating a visual transcript representing the events on the timeline, and the visual transcript being in electronic form for display on a computer display screen for viewing by users;

wherein the listener processor or the server automatically determines a meaning of each captured event by performing a look-up to a table associating event identifiers and associated meanings, wherein the transcript includes captured words, wherein the transcript generator applies a visual image to a specific event, said visual image being visually coded to enhance viewer understanding of that specific event, wherein the listener processor or the server connect a trail of captured events in a sequence, in which length of a trail event sequence is not known until the system saves data for a dialogue interaction to a database;

wherein the listener processor or the server store 1 to N key value pairs for captured events whereby the exact length of a sequence of events is not known until the server saves an interaction, and wherein the processor applies a trail meta tag to selected events according to event category, and automatically groups events out of time sequence according to said trail meta tags.

12. The method as claimed in claim 11, wherein the listener processor automatically captures one or more of:
retrieved customer data,
dialogue duration,
computer application opening or first user access for a dialogue, and/or
computer application closing or last user access for a dialogue;
wherein the listener processor captures events arising from use of a dedicated computer application and executes in parallel with other listener processors recording data from other computer applications.

13. The method as claimed in claim 11, wherein the listener processor automatically identifies a dialogue start event by detecting an event including when the user brings the dialogue party into session on a computer application or dials the dialogue party's phone number, or answers a dialogue party's phone call, and automatically identifies a dialogue end event by detecting when the user brings the dialogue party out of session on a computer application or ending of a phone call to the dialogue party.

14. The method as claimed in claim 11, wherein the system associates audio clips with events, and tags a dialogue timeline, and links said tags with audio clips, and performs user searches for audio clips according to said tags; and wherein the system tags a dialogue using meta-data including application events and screen transitions.

15. The method as claimed in claim 11, wherein the system automatically identifies key events in said detected events and generates a summary transcript of said key events in real time as events are captured.

16. A non-transitory computer readable medium comprising software code configured to perform the steps of a method as claimed in claim 11 when executing on a digital processor.

* * * * *